March 5, 1957  W. B. KING ET AL  2,784,388
TRAFFIC SIGNAL LIGHTS
Filed Sept. 14, 1954  3 Sheets-Sheet 2
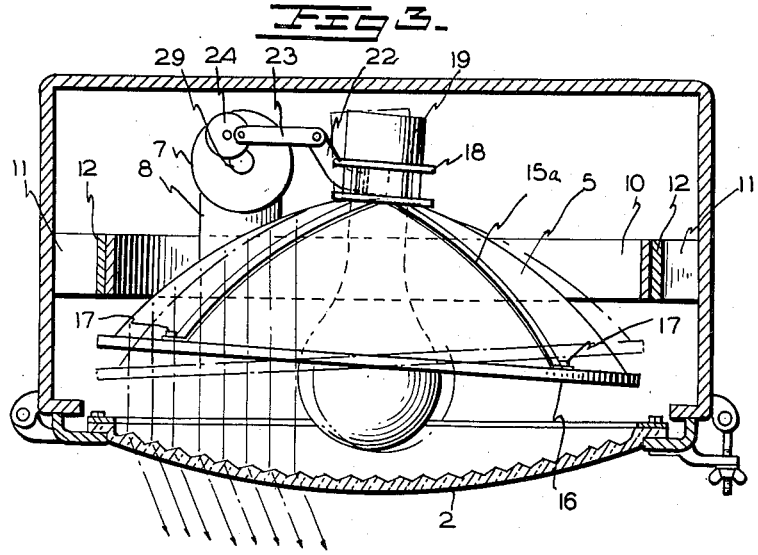
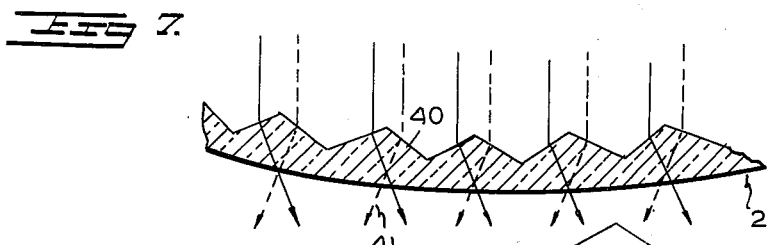
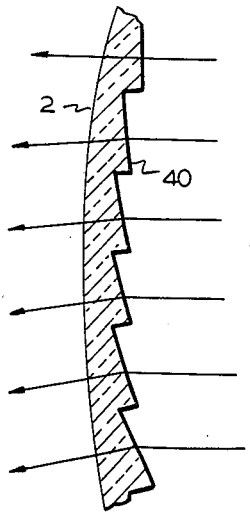
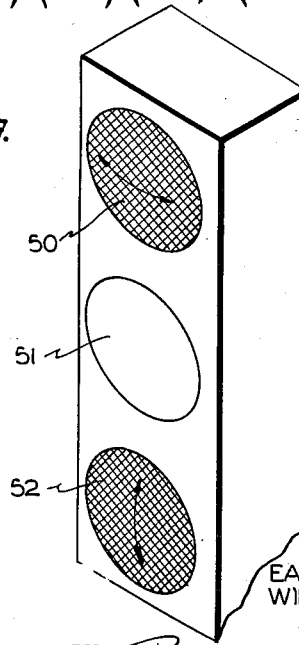
INVENTOR
EARL W. FRENCH
WILLIAM B. KING
BY *Ralph T. Bassett*
ATTORNEY March 5, 1957   W. B. KING ET AL   2,784,388
TRAFFIC SIGNAL LIGHTS
Filed Sept. 14, 1954   3 Sheets-Sheet 3
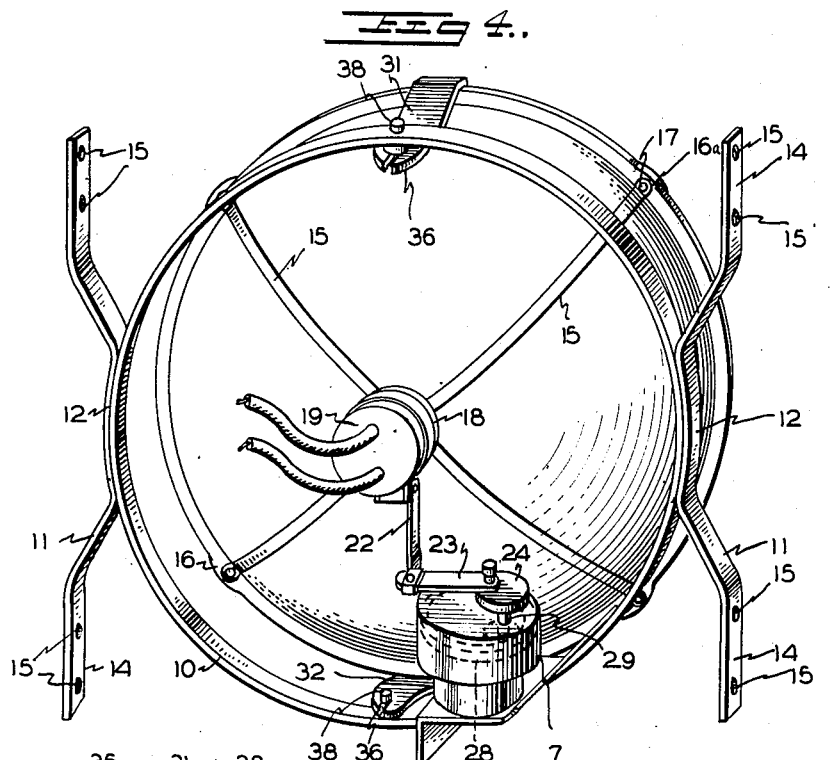
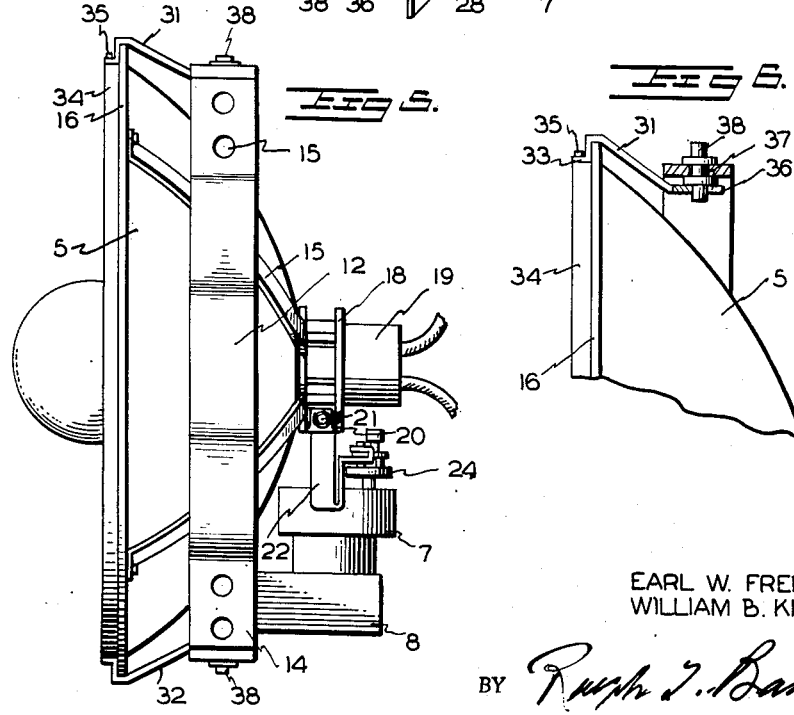
INVENTOR
EARL W. FRENCH
WILLIAM B. KING
BY
ATTORNEY United States Patent Office 2,784,388
Patented Mar. 5, 1957

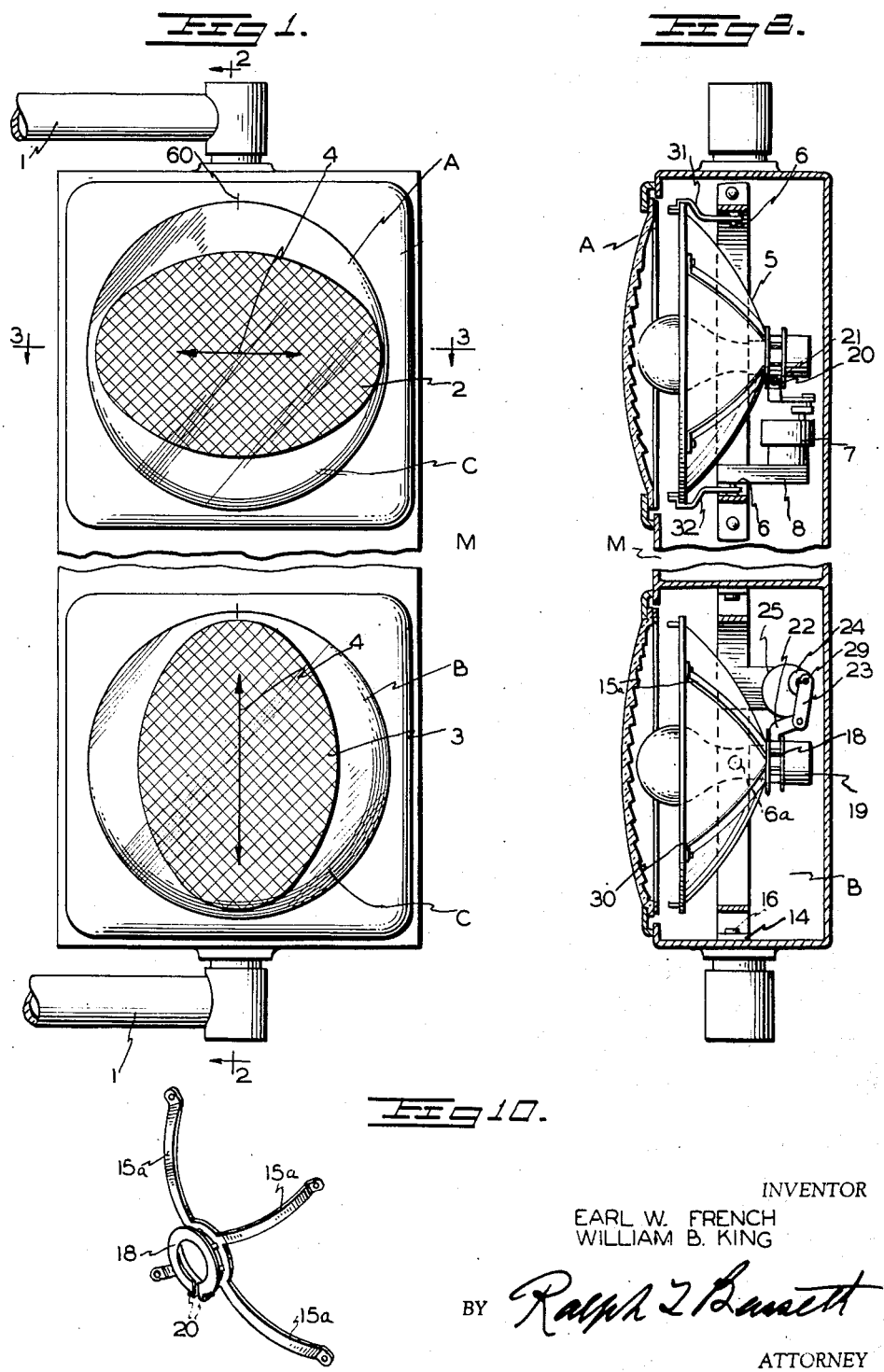

2,784,388

TRAFFIC SIGNAL LIGHTS

William B. King and Earl W. French, Memphis, Tenn.

Application September 14, 1954, Serial No. 455,817

9 Claims. (Cl. 340—22)

This invention relates to improvements in traffic lights, such lights being of the type normally positioned at street and road intersections for the regulation and control of the flow of traffic at such intersections.

The object of the invention is to accomplish the intended purpose by the provision of a swaying or oscillating reflector, the movement of the reflector being horizontal for the red lens and vertical for the green lens, and the oscillating movement being restricted to provide, in cooperation with the lenses, reflection of light more readily visible from various angles of approach of a vehicle, whether the vehicles are directly in line or offset, as in the case of a wide street and/or at an angle as in the case of diagonally intersecting avenues or streets.

Another object of the invention is to construct the lens so that its angles of light projection will absorb the light rays from the oscillating reflector to provide maximum light projection within the possible scope of vision of any driver in traffic.

Another object of the invention is to provide a lens generally of elliptical shape, these large elliptical lenses being associated with the oscillating lights, with the long axis of the light movement in the direction of the elongated axis of the lens, this providing for a more positive signalling movement with a constant light projection throughout the length of travel of the light rays resulting from the oscillating of the light and its reflector.

Another object of the invention is to provide a lens for use with the oscillating projector in which the lens is provided with a plurality of prisms, the latter being so constructed that light is reflected at each side of the prisms upon reversal of oscillation of the source of light, while the medial portion of the prisms will constantly glow.

Another purpose of the development is to provide a lens for the lamp box of general circular form with an elongated medial portion of the lens provided with a special reflective surface to project light rays traveling thereacross in a direction readily visible to a vehicle operator, the lens being reversible from horizontal to vertical position to change the elongated reflective area to the appropriate and proper position for its prescribed function.

Another object resides in the provision of an oscillating assembly which can be used in the conventional street sign, the assembly being capable of adaptation in the conventional street traffic signal without modification of the latter.

Other features of the invention will more clearly hereinafter appear by reference to the accompanying drawings forming a part of the instant application, wherein like characters of reference designate corresponding parts throughout the several views, in which:

Fig. 1 is a front elevation of a traffic signal embodying the present invention;

Fig. 2 is a section on line 2—2 of Fig. 1;

Fig. 3 is a section on line 3—3 of Fig. 1;

Fig. 4 is a perspective view of the light reflector element showing the mounting permitting its assembly in the conventional light casing;

Fig. 5 is a side elevation of the assembly of Fig. 4;

Fig. 6 is a fragmentary view, partly in section, showing one of the pivots for mounting the reflector to the supporting ring;

Fig. 7 is a fragmentary section showing the form of lens of Fig. 3;

Fig. 8 is a vertical fragmentary section of a portion of the lens of Fig. 3;

Fig. 9 is a perspective view of a light structure in which the middle yellow light is shown embodied with the stop and go oscillating lights; and Fig. 10 is a perspective view of the reflector spider structure.

In Fig. 1 there is shown in front elevation an adaptation of the instant invention in which the traffic light casing is supported between brackets or hangers 1 and 2, these brackets or hangers being shown of tubular form to facilitate the passing of the current carrying wires to the operating and control structure contained within the casing. In Fig. 1 there is shown a red light chamber A and a green light chamber B, these chambers being separated in the drawing by a break as at M to indicate that medial signal chambers might also be provided, as for instance to contain special direction signals, arrows or conditioning lights, i. e. a yellow intermediate light might be interposed in the assembly of Fig. 1.

In the disclosure of Fig. 1, the lenses are generally circular, with the elliptical portion 2 in the upper red light chamber A having its axis generally horizontal and the lens 3 in the light chamber B with its elliptical axis arranged vertically. The direction arrows 4 are used in these chambers to indicate the direction of the movement of light reflection which will be more obvious from an inspection of Fig. 2, this figure showing the mounting of the oscillating mechanism in chamber A to oscillate the reflector 5 on its vertical pivots 6 by means of the motor 7 mounted on the bracket shelf or extension 8. For a better understanding of the particular motor structure and the mounting reference will be had to Figs. 4, 5 and 6.

Fig. 4 shows the assembly for supporting and oscillating the reflector as including a mounting ring 10 to the diametrically opposite lateral faces of which are attached the flat elongated fastening straps or brackets 11, the latter having medial portions 12 shaped to conform to the outer face of the supporting ring 10 and attached thereto by welding or otherwise. The extremities of the fastening brackets 11 are generally in axial alignment and are shown at 14 to be relatively flat and also as being provided with openings 15 through which fastening rivets or screws extend to secure the structure to the main casing as at 16 in Fig. 2. Both of the brackets 11 are identical and are of such length as to normally fit within the conventional traffic signal housing, and to be positioned within the housing for arranging the oscillation of the projector 5 for movement in either the positive vertical or negative horizontal direction, as best shown in Fig. 2. In Fig. 2 the projector is arranged in chamber A to swing on the vertical pivots 6, while in the chamber B the pivots 6ᵃ are horizontal for movement of the projector in vertical position or at 90 degrees to the direction of the movement of the projector in chamber A.

In the structure shown a spider is provided, see Fig. 10, this spider having its spaced arms 15ᵃ projecting forwardly to the enlarged rim portion 16ᵃ, see Fig. 4, and fastened thereto by screws 17. The hub of the spider is in the form of a fabricated cylinder 18 which seats on the lamp socket 19 and this spider hub 18 has depending ears 20 which is connected to the end of the arm 22 by means of a fastener 21. The arm 22 is actuated by lever 23 and oscillated by virtue of slowly rotated and driven power element 24 which is actuated by the motor 7, the details of which are not herein disclosed inasmuch as such small rotating electric motors are conventional and normally actuate an enlarged internal gear, such as shown in dotted lines at 28, which mesh with gears on the end of the shaft 29 on which the rotating head 24 is fixed.

For clamping the flange 30 of the reflector to the supporting ring 10 there are provided two straps 31 and 32, these straps having inwardly offset extremities 33 seated on the flanges 34 of the reflector and secured thereto by screws 35 or otherwise. These straps 31 and 32 have their medial body portions bent downwardly and their extremities 36 extending substantially in parallel planes and provided with central openings 37 through which pivot pins 38 extend. The pivot pin for the anchor strap 31 is carried by the extremity of the strap and extends through an opening in the supporting ring 10, while the opposite strap 32 has the pin mounted in the ring and extending through the perforation in the strap. In this way removal of the supporting ring and actuating structure is readily accomplished by shifting the parts relatively for the removal of the pins in opposite directions as will be obvious to one skilled in the art.

As a result of the foregoing structure a reflector and lamp support is provided which can be inserted in and removed from any conventional traffic signal housing with the pivots either horizontally or vertically arranged, whereby the direction of the movement of the reflector and lamp will correspondingly move in either horizontal or vertical direction to conform to requirements of the lamps in the chambers A and B, representing in the present illustrations directions of movement corresponding to the intent and purpose of the two signals.

In that form of the invention in which the active part of the lens is generally elliptical, it has been found that the lens may be generally circular with the elliptical portion embracing the reflective surface and the plane portion as indicated at C in Fig. 1 having no reflective surface but being generally in the chamber A, of plain red glass. The lens structure is best shown in Figs. 7 and 8 in which lens prisms 40 have two diverging faces mounted for receiving the traveling rays and for projecting the rays angularly in reverse directions as indicated by the arrows 41. Fig. 8 is a transverse section of the same lens taken at 180 degrees from the disclosure in Fig. 7 and this lens structure merely absorbing and deflecting the light forwardly in a general horizontal plane.

In Fig. 9 there is a disclosure of a signal light having three compartments 50, 51 and 52. In Fig. 9 the reflectors are generally circular with the light of compartment 50 moving horizontally and utilizing the novel lens structure of Figs. 7 and 8 for directing the rays angularly either to the right or left in a horizontal plane. The lens of compartment 51 would be plain yellow, while the lens of compartment 52 is provided for receiving the vertically oscillating reflector and similarly includes the lens structure with the reflecting surfaces tending to deflect the light upwardly and downwardly during the travel of the oscillating light and reflector.

The lens having the oval reflecting surface, shown in Fig. 1, is capable of being received and positioned in the lens frame in either vertical or horizontal position, suitable notches 60 being provided in the casing for receiving a projection on the outer lens periphery for locating the lens in its holder in either vertical or horizontal position and locking it in its proper position. It will be obvious to one skilled in the art that the proposed lenses are adapted for use in conventional boxes and that the lenses are capable of being shifted from horizontal to vertical position, provided, of course, the color is appropriate for such adjustments. For normal installation, the vertical oval lens structure will be green to indicate the "go" or positive signal, while the horizontal oval lens structure will be red to indicate the "stop" or negative signal. It will also be obvious to one skilled in the art that the yellow caution lens or any other lens commercially used in any installation could adopt the present idea or a single chamber box could be installed, as occurs at some intersections, merely for stopping traffic for predetermined periods or as the result of specially controlled automatic signalling systems. Where a single lens is used it could be a caution lens, including a red oval portion, for use in connection with the projector or it could be a plain red lens with the oval reflecting surface cooperating with the oscillating projector.

What I claim is:

1. In a traffic signal device including a plurality of spaced aligned colored lenses, individual light supports and lights supported therein rearwardly of the colored lenses whereby the light rays from the light source project through the lenses, one of the lenses being colored red and at least one of said lenses being colored green to indicate the usual stop and go movement of traffic, means for oscillating the light support positioned rearward of the red lens in a horizontal direction, and additional means for actuating the light support positioned rearward of the green lens in a vertical direction, the said means for oscillating the light support for the red lens and for actuating the light support for the green lens being operative when current is supplied to the red lens or to the green lens, respectively.

2. In a traffic signal, a casing having therein a red or green lens to indicate stop or go signal, a light support positioned rearwardly of the signal, said light support being mounted in a removable frame fixed within the casing, a motor in the frame engaging the light support and having means associated therewith for oscillating the same in a single plane, said frame being shiftable to an alternate position at 180° to its original position, whereby the operation of the oscillating means will cause movement of the light support and the rays projecting from the light supported thereby in a single plane at 180° from the original position.

3. In a light support, a casing including a plurality of aligned lenses, lamps positioned rearwardly of the lenses, each of the lamps being supported by a frame shiftable to 180° and including means for oscillating the lamps in a single plane.

4. In a traffic light, a housing including top, sides and back wall, a front wall comprising a frame and a lens, said lens being arranged in said frame for movement to alternate horizontal and vertical positions, a reflector supporting frame for arrangement in said housing, said frame including a main annular frame element having a pair of diametrically oppositely extending brackets for engaging the inner housing surface, said main frame including a shelf, a motor mounted on the shelf, a lamp socket fixed to said reflector and power transmitting means between the motor and said lamp socket, including means operated by the motor for oscillating the lamp socket and reflector in a single plane, and supporting arms engaging the main supporting frame and said reflector for pivotally supporting said reflector at diametrically opposite points intermediate the attaching brackets.

5. The structure of claim 4 characterized in that the reflector is mounted on a spider, the spider including a hub embracing the lamp socket and having arms radiating from the hub and secured to the rim of the reflector.

6. The structure of claim 4 characterized in that the connecting arms between the main supporting bracket and the reflector rim are removably connected with associated pivot pins engaging the main supporting bracket.

7. The structure of claim 4 characterized in that a pivot pin is supported by the main bracket and by one of said connecting arms whereby said connecting arms are removably associated with the main bracket to permit convenient insertion and removal.

8. The structure of claim 4 characterized in that a clamp member embraces the lamp socket and is connected by linkage with said motor whereby movement of the motor oscillates said reflector on its pivotal supports.

9. A traffic signal comprising a casing having portions defining a series of light chambers, said casing including sides, ends and rear wall, hinge lens plates closing the front wall of the chambers, said lens plates each including a frame having a lens therein and means for clamping the lens to permit movement to preselected positions, one lens having red and another lens having green colored reflector surfaces of elongated design, a reflector pivotally mounted in each chamber rearwardly of the lens, said reflectors including lamp sockets, lamps in said sockets, supports for said reflectors, motors carried by the supports, and driving means between the motors and the lamp sockets, including means for selectively oscillating the sockets with the reflectors.

References Cited in the file of this patent

UNITED STATES PATENTS

| | | |
|---|---|---|
| 1,628,756 | Taylor | May 17, 1927 |
| 1,995,816 | Adler | Mar. 23, 1935 |
| 2,268,476 | Duncan | Dec. 30, 1941 |
| 2,446,333 | Kennelly | Aug. 3, 1948 |
| 2,534,992 | Reid | Dec. 19, 1950 |
| 2,595,253 | Heehler, et al. | May 6, 1953 |
| 2,654,875 | Heehler | Oct. 6, 1953 |